United States Patent Office 2,890,981
Patented June 16, 1959

2,890,981

ANTHELMINTIC COMPOSITIONS

Joseph J. Ursprung, New London, Conn., assignor to Chas. Pfizer & Co., New York, N.Y., a corporation of Delaware No Drawing. Application July 29, 1957
Serial No. 674,581

3 Claims. (Cl. 167—53)

This invention relates to a new group of therapeutic agents useful in the treatment of helminthic infections and to the therapeutic treatment of such conditions with these agents. More particularly, this invention relates to the use of quinoxaline-N,N'-dioxides and their salts in the treatment of helminthiasis.

Helminthic infections are among the most common disease conditions in the world today. They involve infestation of the body of animals and human beings with various types of parasitic worms known as helminths. The public health significance of these organisms and the economic losses brought about by infestation of humans, household pets and domestic animals have resulted in extensive research for new and more effective anthelmintics.

A variety of agents have been used for the treatment of helminthiasis. These include herb preparations such as arecoline, aspidium, and chenopodium, heavy metal compounds like antimony and arsenic compounds; phenolic substances including thymol and hexylresorcinol; and a number of synthetic materials. Many of these have fallen into disrepute due to their toxicity, low activity, and/or limited anthelmintic spectrum. Indeed there are a number of disease-producing helminths that are resistant to all presently known agents and methods of therapy. Any addition to the anthelmintic armamentarium useful against such organisms would be indeed welcome. Thus, a definite need exists for effective, inexpensive, well-tolerated anthelmintic agents and particularly ones which are effective against these resistant species.

Recently piperazine and some of its derivatives have come into favor as anthelmintic agents. The activity of piperazine, however, is limited primarily to pin worm infestations (oxyuriasis) and large round worm infestations (ascariasis). Among the untoward side effects of many prior art anthelmintics are diarrhea, urticaria, vomiting, blurred vision, and general muscle weakness. Further, many anthelmintics are quite rapidly absorbed from the gastro-intestinal tract. This, of course, is disadvantageous since helminthic infestations are frequently seated in the intestinal tract, and it is important to mainain therapeutic levels of the drug in these organs.

It is an object of this invention to provide novel anthelmintic dosage forms which are particularly effective, nontoxic and characterized by high levels of activity for extended periods of time. A further object is to devise new and improved methods for treating helminthiasis in animals and humans. Other objects will become apparent from the ensuing description of the invention.

These objects are realized by the provision of anthelmintic compositions comprising certain quinoxalines in pharmaceutically acceptable carriers. These quinoxalines are 2,3-dimethylquinoxaline-N,N'-dioxide and 2,3-bis(hydroxymethyl)quinoxaline-N,N'-dioxide and can be prepared in accordance with the method described by Landquist et al. in the Journal of the Chemical Society, 1956, 2052, et. seq. Thus a particularly effective composition is one containing an orally administrable carrier together with 2,3-dimethylquinoxaline-N,N'-dioxide, which is especially effective in treating infestations of pinworms.

Use of these compositions for the treatment of helminthiasis in man and animals according to the present invention involves intestinal contact of the infecting helminth with the drug. Dosage is preferably by the oral route, since the major site of infection is ordinarily the intestinal tract. It is of course possible to administer these drugs rectally, but this method is not so convenient as oral medication. One of the attributes of these new drugs is that they are highly effective orally. The daily dose required varies with the particular composition employed and the animal or human being treated.

For the treatment of domestic animals, a single dose of one of the new compositions containing an amount of the quinoxaline from about 75 to 300 mg./kg. of body weight is generally sufficient to clear the animal of the infecting parasite. Doses as low as 10–25 mg./kg. can be used if repeated on three or more consecutive days. Dosages from about 175 to about 250 mg./kg. for pinworms is most satisfactory.

Administration of the compositions to animals can best be effected by mixing the drug with the feed. Thus, the required dose for the animal is calculated on the basis of the above formula and the drug is then blended with all or a portion of the animal's daily ratio. The quinoxalines can be supplied in substantially pure form, or they can be diluted with inert carriers such as starch, lactose, etc. This is preferred with small animals where the total dosage is low, since blending of only a few milligrams of drug with a relatively large amount of feed is inconvenient. For this purpose a dry solid composition containing the calculated dosage of the quinoxalines is blended with a convenient amount of carrier, generally from about 1 to 10 parts by weight based on the weight of the quinoxaline.

In humans, as with animals, the dosage varies with the size of the patient. Two courses of treatment with the anthelmintic dosage form, each lasting approximately one week separated by a rest period of about one week, are preferred for the treatment of pinworm, for example. A single course of treatment may be used. For infants weighing less than 15 pounds a daily dose of 75 mg. is recommended. For children weighing between 15 and 60 pounds, twice this dosage is employed. With adults, and large children (over 60 lbs.) two to four 150–500 mg. doses per day during each course of treatment are preferred. Thus, the useful dosage range for humans is from about 75 mg. to about 2 g. per day or from about 10 to 75 mg./kg. per day.

For human and household pet dosages, the quinoxalines can be compounded into any of the usual oral dosage forms including capsules, tablets, and liquid preparations such as elixirs and suspensions containing various coloring, flavoring, and taste masking substances. The active anthelmintic ingredient for this purpose can be diluted with various tableting materials such as starches of various types, calcium carbonate, lactose, sucrose, and dicalcium phosphate to simplify the tableting and capsuling process. A minor proportion (1–2%) of magnesium stearate is useful as a lubricant. For children it is convenient to prepare the tablets containing between 35 and 150 mg. of the quinoxaline per tablet. For adults larger tablets containing up to about 500 mg. of active ingredient are useful. It is generally considered desirable to avoid tablet weights in excess of about 700 mg. The amount of active ingredient then varies from about 5 to 70% of the total tablet weight. With capsules of various types, the proportion of carrier is of less importance.

In the preliminary evaluation of the anthelmintic agents of this invention, and as a proof of their valuable activity, mice with a natural infection of pin worm (*Syphacia obvelata*) were treated. This particular test was used because, as pointed out by Brown et al. and by Chan [Exp. Parasit., III, 45–51 (1954); Am. Journ. of Hyg. 56, 14–21 (1952), and 56, 22–30 (1952)], results with this parasite are often similar to the results obtained with other helminthic infections, particularly *Enterobius vermicularis* in man.

In carrying out the test, a number of mice were infected with *Syphacia obvelata* by associating them with naturally infected mice known as source mice. The experimental mice acquired their infection over a number of days and therefore harbored worms in several stages of development when treated with the test compounds. The technique is described by Chan in the Am. Journ. of Hyg. 56, 22–30 (1952). The test mice were housed for a period of eight days with the source mice during which time they became infested with the pinworm which as pointed out above is similar in its host parasite relationship to nematodes of human and veterinary importance. On the 8th and 9th days after exposure to the source mice, the particular compound being evaluated was administered to the test mice by the oral route. A single dose daily was employed on each of the days. The treated mice were then sacrificed on the eleventh day, about forty-eight hours after their last doses of the drug, and all stages of *S. obvelata* in the cecum were counted. Differences in the worm burden between the treated animals and with other animals identically infected but not treated provided a numerical value called the percent reduction in worm burden which served to express the relative antipinworm activities of the compounds. The results of the tests are tabulated in Table I below.

TABLE I

| | | | | | |
|---|---|---|---|---|---|
| 2,3-dimethylquinoxaline-N,N'-dioxide: | | | | | |
| Dosage in mg./kg. | 250 | 125 | 62.5 | 31.2 | 15.6 |
| Percent reduction | 100 | 100 | 90 | 74 | 35 |
| 2,3-bis(hydroxymethyl)quinoxaline-N,N'-dioxide: | | | | | |
| Dosage in mg./kg. | 250 | | 125 | | 62.5 |
| Percent reduction | 100 | | 85 | | 40 |

As aforesaid, salts of the specified quinoxaline-N,N'-dioxides may also be employed in these new compositions. These salts are readily prepared from pharmaceutically acceptable acids, but since the dioxide bases have an extremely low basicity it is necessary to employ relatively strong acids, preferably those having an ionization constant of at least $10^{-3}$ in aqueous solution. Thus it is specifically intended to include within the purview of the instant invention compositions containing pharmaceutically acceptable salts derived from acids having an ionization constant of at least $10^{-3}$ in aqueous solutions. An ionization constant of this order is generally only available from inorganic acids such as hydrochloric, hydrobromic, hydriodic, sulfuric, nitric, phosphoric etc., but certain organic acids, notably maleic and such sulfonic acids as ethanedisulfonic acid also have an ionization constant of this order.

These acid addition salts are readily prepared by procedures well known to those skilled in the art. One very convenient method for the preparation of these salts is to dissolve the base in an anhydrous solvent and to treat the solution with an anhydrous acid, for example, hydrochloric or hydrobromic. The acid addition salt will generally precipitate or it can be obtained by evaporation of the solvent in vacuo.

Another highly useful method for converting one acid addition salt to another acid addition salt comprises contacting the original salt with a basic anion exchange resin. A highly basic resin such as the product available from Rohm & Haas Company under the trade name Amberlite IRA–400 is especially suitable. It is employed in the acid form. The resin itself is a polyquaternary ammonium compound which is prepared by chloromethylating a highly cross-linked copolymer of styrene and divinylbenzene followed by treatment of the chloromethylated material with a tertiary amine such as trimethylamine. To prepare an acid addition salt for use in this invention, for example the sulfuric acid salt, the resin is first contacted with an aqueous solution of sulfuric acid whereupon an anion exchange takes place converting the quaternary halide to the acid addition salt. The acid resin is then contacted with other acid addition salts of this invention, for example the hydrobromide, and a further anion exchange takes place converting the hydrobromide acid addition salt to the sulfate acid addition salt and converting the resin to the hydrobromide. The sulfuric acid addition salt can be recovered from the eluate by a number of methods such as evaporation or solvent precipitation.

Various substituents can be introduced on the quinoxaline nucleus to reduce or enhance the activity of the compounds herein described. For example, 6-chloro-2,3-dimethylquinoxaline-N,N'-dioxide when administered to mice infected with mouse pinworm (*Syphacia obvelata*) effected a one-hundred percent reduction in worm burden at a dosage of 250 mg./kg., one-hundred percent reduction at 125 mg./kg. and seventy-two percent reduction at 62.5 mg./kg.

No toxic manifestations in the host were observed in the above experiments even at the highest dosage level. This is a significant advantage since other compounds which have been heretofore recommended as anthelmintic agents have been severely limited in their use because of high toxicity.

The following examples are given simply to illustrate this invention, but not in any way to limit its scope.

*Example I*

A young colt weighting 100 pounds was diagnosed as being infested with *Oxyuridae equi* by examination of its feces by the flotation method. Two grams of 6-chloro-2,3-dimethylquinoxaline-N,N'-dioxide (prepared in accordance with the method described in U.S. Patent 2,626,259 issued January 20, 1953), were then mixed with the animal's daily ration which was entirely consumed by the animal. After about 72 hours no further ova were detectable in the feces. The animal was sacrificed and found to be free of the helminth on post mortem examination.

*Example II*

A young sheep weighing 60 pounds was diagnosed as being infested with *Skrjabinema ovis* by examination of its feces by the flotation method. One and one-half grams of 2,3-dimethylquinoxaline-N,N'-dioxide were then mixed with the animal's daily ration which was entirely consumed by the animal. After about 72 hours no further ova were detected in the feces. The animal was sacrified and found to be free of the helminth on post mortem examination.

*Example III*

One-half gram of 2,3-bis(hydroxymethyl)quinoxaline-N,N'-dioxide was blended with an equal weight of lactose and sealed in a paper envelope. This composition was then employed for mixing with the daily ration of a 30-pound dog for the successful treatment of a nematode infestation.

*Example IV*

The following materials were thoroughly blended and then compressed into tablets containing 30 mg. of 2,3-dimethylquinoxaline-N,N'-dioxide per tablet.

| | Grams |
|---|---|
| 2,3-dimethylquinoxaline-N,N'-dioxide | 3 |
| Lactose | 28.7 |
| Magnesium stearate | 0.3 |

Two of these tablets per day were then administered for seven days to a three year old child weighing 30 pounds, diagnosed as being infested with pinworms. This was followed by a seven day period in which none of the composition was administered, which was in turn followed by a second similar seven-day course of treatment. At the end of this period the child was cleared of the pinworm infestation.

*Example V*

To a commercially available raspberry-flavored sugar syrup was added the equivalent of 100 mg. of 2,3-bis-(hydroxymethyl)quinoxaline-N,N'-dioxide hydrochloride per milliliter, and the mixture was homogenized in a mechanical device for this purpose. Daily administration of one half teaspoonful of the resulting elixir per day for a period of 14 days successfully cleared a 30 pound child of a pinworm infestation.

*Example VI*

The following materials were thoroughly blended and then compressed into tablets each containing 125 mg. of 2,3-dimethylquinoxaline-N,N'-dioxide as the hydrochloride salt. The total tablet weight was 500 mg.

| | Grams |
|---|---|
| Quinoxaline-N,N'-dioxide | 12.5 |
| Starch | 12.5 |
| Lactose | 24.5 |
| Magnesium stearate | 0.5 |

Four of these tablets taken daily for five days in two doses per day was sufficient to clear a 60 pound child of a tapeworm infestation.

Similar tablets, containing respectively the hydrobromide and hydroiodide salts of the same quinoxaline in lieu of the hydrochloride were also similarly effective.

*Example VII*

Aqueous suspensions were prepared, each containing 50 mg. per teaspoonful (5 ml.) of each of the quinoxalines employed in Examples I through VI, in a vehicle composed of U.S.P. simple syrup containing the following materials per 100 ml. of vehicle.

| | |
|---|---|
| F.D. & C. yellow No. 5 mg | 5 |
| Carboxymethylcellulose, low viscosity type mg | 1 |
| Synthetic lemon flavor (Fritche) ml | 0.1 |

These suspensions were particularly well adapted for administration to children unable or unwilling to swallow tablets or capsules.

*Example VIII*

Anhydrous hydrogen chloride was bubbled into 50 cc. of anhydrous chloroform containing 5 g. of 2,3-dimethylquinoxaline-N,N'-dioxide and the hydrochloride of the free base precipitated. It was recovered by filtration.

*Example IX*

Anhydrous hydrogen bromide was bubbled into 50 cc. of ether containing 5 g. of 2,3,-bis(hydroxymethyl)-quinoxaline-N,N'-dioxide and the hydrobromide of the free base precipitated. It was recovered by filtration.

*Example X*

A 15% aqueous solution of 6-chloro-2,3-dimethylquinoxaline-N,N'-dioxide hydrochloride was stirred for three hours with an anion exchange resin which had been washed previously with aqueous sulfuric acid. The resin was removed by filtration and the solvent removed in vacuo to leave the sulfuric acid addition salt of 6-chloro-2,3-dimethylquinoxaline-N,N'-dioxide as a residue.

Included among the anion exchange resins which were successfullly employed for this process were Amberlite IRA–410 and Amberlite IRA–400 available from Rohm & Haas Company and Dowex-1 and Dowex-2 available from the Dow Chemical Company.

A number of other acid addition salts of this compound were prepared using this procedure. These included the nitrate, hydriodide, and phosphate.

Analogous acid addition salts were prepared from 2,3-dimethylquinoxaline-N,N'-dioxide hydrochloride and 2,3-bis(hydroxymethyl)quinoxaline-N,N'-dioxide hydrochloride.

What is claimed is:

1. A process for treating helminthic infestations of man and animals which comprises orally administering to the so infected host a compound selected from the group consisting of 2,3-dimethylquinoxaline-N,N'-dioxide; 2,3-bis (hydroxymethyl) quinoxaline-N,N'-dioxide; 6-chloro-2,3-dimethylquinoxaline-N,N'-dioxide and the pharmaceutically acceptable acid addition salts of said N,N'-dioxides, said acid addition salts being derived from acids having an ionization constant of at least $10^{-3}$ in aqueous solution, together with a pharmaceutically acceptable carrier.

2. A process for treating helminthic infestations in humans, which comprises orally administering to the so infected host a compound selected from the group consisting of 2,3-dimethylquinoxaline-N,N'-dioxide; 2,3-bis (hydroxymethyl) quinoxaline-N,N'-dioxide; 6-chloro-2,3-dimethylquinoxaline-N,N'-dioxide and the phamaceutically acceptable acid addition salts of said N,N'-dioxides, said acid addition salts being derived from acids having an ionization constant of at least $10^{-3}$ in aqueous solution, together with a pharmaceutically acceptable carrier, the dosage level per day of the dioxide being between about 10 and about 75 mg./kg. of body weight.

3. A process for treating helminthic infestations in animals which comprises orally administering to the so infected host a compound selected from the group consisting of 2,3-dimethylquinoxaline-N,N'-dioxide; 2,3-bis (hydroxymethyl)quinoxaline-N,N'-dioxide; 6-chloro-2,3-dimethylquinoxaline-N,N'-dioxide and the pharmaceutically acceptable acid addition salts of said N,N'-dioxides, said addition salts being derived from acids having an ionization constant of at least $10^{-3}$ in aqueous solution, together with a pharmaceutically acceptable carrier, the dosage level of the dioxide being between about 75 and about 250 mg./kg. of body weight.

References Cited in the file of this patent

UNITED STATES PATENTS 2,626,259    Lindquist _____ Jan. 20, 1953